United States Patent
Broberg et al.

(10) Patent No.: US 6,214,403 B1
(45) Date of Patent: Apr. 10, 2001

(54) PREPARATION OF BREADING PRODUCT AND BREADED FOODSTUFFS FOR OVEN-COOKING

(75) Inventors: Lars Broberg, Jonstorp (SE); Jean-Jacques Desjardins, Denges; Pierre Dupart, Preverenges, both of (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 08/220,808

(22) Filed: Mar. 30, 1994

(30) Foreign Application Priority Data

Apr. 7, 1993 (EP) .................................................. 93105740

(51) Int. Cl.$^7$ ....................................................... A23L 1/10
(52) U.S. Cl. ........................................... 426/549; 426/549
(58) Field of Search ............................................. 426/549

(56) References Cited

U.S. PATENT DOCUMENTS

| 4,218,480 | 8/1980 | Dyson et al. . |
| 4,364,961 | 12/1982 | Darley et al. . |
| 4,440,793 | 4/1984 | Seki . |
| 4,568,550 | 2/1986 | Fulger et al. . |
| 4,609,557 | * 9/1986 | Mao et al. ............................ 426/549 |
| 4,609,558 | * 9/1986 | Giacone ................................ 426/549 |
| 4,943,438 | 7/1990 | Rosenthal . |

FOREIGN PATENT DOCUMENTS

| 0966891 | 8/1961 | (GB) . |
| 2095529 | 10/1982 | (GB) . |
| 2136666 | 9/1984 | (GB) . |
| 2176089 | 12/1986 | (GB) . |

* cited by examiner

*Primary Examiner*—Helen Pratt
(74) *Attorney, Agent, or Firm*—Vogt & O'Donnell, LLP

(57) ABSTRACT

Breadcrumbs for coating a food are prepared by extrusion-cooking ingredients of a ground cereal, a reducing sugar, a fat, particularly hydrogenated palm oil, and water to obtain an extruded, cooked product which then is ground to obtain a ground particular which is dried to obtain a dried product. The extrusion-cooking is carried out a temperature of at least 150° C. and under a pressure of at least 45 bar, and the fat is employed in an amount so that the dried product has a fat content of from 7% to 12% by weight. The breadcrumbs, when coated on a food product, enable obtaining a breadcrumb-coated oven-cooked food product similar to an oven-cooked breadcrumb product without frying of the breadcrumbs or the coated product in oil.

14 Claims, No Drawings

PREPARATION OF BREADING PRODUCT AND BREADED FOODSTUFFS FOR OVEN-COOKING

BACKGROUND OF THE INVENTION

This invention relates to preparation and use of breadcrumbs for coating food products intended to be oven-cooked their production.

U.S. Pat. No. 4,364,961 describes a process for the production of breadcrumbs in which a mixture containing at least 95% of flour, 2.5 to 3% of fats and yeast is prepared and mixed in an extruder, a gas such as carbon dioxide is injected into the extruder at several places to form an aerated mixture which is then heated and extruded at a temperature of the order of 30 to 100° C. and under a pressure of 14 to 42 bar (200 to 600 psig). The product thus obtained is then cut into small pieces and dried. The breadcrumbs thus obtained may be used to coat food products, such as pieces of meat or fish, which are subsequently regenerated by frying in hot oil.

During this final step of frying in oil, the breadcrumbs are grilled and roasted and give the appearance of a cooked product, a crispy texture and an agreeable taste to the fried product coated with them. However, the breadcrumbs also absorb a large quantity of fats (approximately half their weight), so that the fried coated product obtained is rich in fats.

Now, the modern trend among consumers is to avoid the consumption of high-fat products, more particularly products cooked by frying in oil.

One solution is proposed in U.S. Pat. No. 4,943,438 which relates to a new type of breadcrumbs for coating products intended for regeneration in a conventional oven or in a microwave oven. Unfortunately, the regenerated products coated with these breadcrumbs are reminiscent in their taste and texture of products obtained by frying in oil. The coated product according to this document may be obtained in various ways, one of which comprises a sequence of particular steps in which the product to be breadcrumb-coated is coated with a binder and then with breadcrumbs obtained by extrusion of a dough containing approximately 20% of flour and 80% of water, the product thus breadcrumb-coated is then oven-cooked in air with a certain humidity level, oil is sprayed onto the cooked breadcrumb-coated product and the sprayed product is exposed to a high temperature of the order of 375 to 480° C. to give the product a brown and crispy surface.

Although it gives satisfactory results, this known process has the disadvantage that it is neither quick nor easy to carry out in view of the numerous steps which it involves. In addition, it involves repeated handling of the breadcrumbed product and the use of special installations.

SUMMARY OF THE INVENTION

The problem addressed by the present invention was to provide breadcrumbs with which it would be possible to obtain a breadcrumb-coated product similar in taste, texture and appearance to a breadcrumb-coated product regenerated by frying in oil, but would be regenerated by passage through a conventional oven with no need for any oil to be added.

Accordingly, the present invention relates to breadcrumbs for food products intended to be oven-cooked, characterized in that they consist of ground cereals, a sugar or sugars, and preferably a reducing sugar or sugars, and more than 7% by weight of fats.

The present invention also relates to a process for the production of the breadcrumbs comprising the steps of introducing into an extruder a mixture containing ground cereals, a sugar and fat in such a quantity that the end product has a fat content of at least 7% by weight, subjecting the mixture to extrusion cooking at a temperature of at least 150° C. and under a pressure of at lesat 45 bar and then grinding and drying the extruded product.

Finally, the present invention relates to a food product partly or completely coated with the breadcrumbs according to the invention.

DETAILED DESCRIPTION OF THE INVENTION

Throughout the remainder of the present specification, percentages are by weight.

One advantage of the invention is that it enables already existing installations to be used on an industrial scale without having to be adapted or modified, for example according to the composition of the breadcrumbs or the process used for applying the breadcrumbs (for example no additional prefrying step).

Another advantage of the invention is that it enables regenerated breadcrumb-coated products to be obtained which are low in fats but which are similar in taste and appearance to fried breadcrumb-coated products and retain their crispy texture.

The present invention is distinguished in particular by the fact that it enables breadcrumbs suitable for regeneration in a conventional oven to be obtained by a process combining an extrusion cooking step under particular conditions of high temperature and pressure and a starting mixture of particular composition in regard to its fats content.

In carrying out the process according to the invention, the ground cereals may be a semolina or flour of wheat, rice or oats, for example, either individually or in admixture with one another. The sugar or may be dextrose, lactose, glucose and fructose, either individually or in admixture with one another, and contains reducing sugars which enable an attractive colour to be given to the breadcrumbs by Maillard reaction after their regeneration.

The fat may be, for example, hydrogenated palm oil. In fact, any type of fat may be used although, if it is desired to keep the breadcrumbs for a certain time, it is necessary to use a fat which will not turn rancid, i.e. a fat mainly containing saturated fatty acids.

The fat is added to the mixture to be extruded in such a quantity that the final breadcrumbs contain at least 7% by weight and preferably 8 to 12% by weight of fats. Salts, spices, colourants and any permitted food additive, such as skimmed milk powder, may also be added to the mixture.

Water may also be added to obtain an extrudable mixture, i.e. a mixture having a dry matter content of at least 75% and generally of the order of 75 to 80%.

A single-screw or twin-screw cooker-extruder may be used. If a single-screw cooker-extruder is used, it is important initially to prepare a perfectly homogeneous mixture of the various starting materials and to adjust the dry matter content accordingly, for example to a value of 75 to 82%. In addition, in a single-screw cooker-extruder, the maximum reachable temperature may constitute a limit to the process according to the invention.

In this case, it is preferable to use a twin-screw cooker-extruder with which it is possible to reach much higher temperatures. Another advantage of the twin-screw cooker-extruder is that there is no need to prepare a mixture of the various starting materials for introduction into the extruder. On the contrary, it is possible independently to introduce each starting material one after the other and then to adjust the dry matter content. In this case, all the starting materials are mixed together in a first part of the extruder.

The extrusion process is preferably carried out at a temperature of 150 to 230° C. under a pressure of at least 45 bar and for a short time of at least 30 seconds and of the order of 30 to 80 seconds. Screws rotating at a high speed of the order of 200 to 250 revolutions per minute are preferably used. These extrusion conditions provide for expansion of the product as required.

A product in the form of pellets with a dry matter content of the order of 85 to 92% is obtained at the extruder exit.

The extruded product is then ground, for example in a conventional grinder or mill, to obtain irregularly shaped particles of the order of 0.5 to 2.0 mm in size.

The extruded and ground product is then dried in an apparatus suitable for drying a powder-form product, for example a fluidized-bed dryer. The product is thus dried to a dry matter content typical of products of this type, i.e. of the order of 92 to 95%, which provides the product with good keeping qualities. The breadcrumbs thus obtained may be stored for at least 12 to 18 months at ambient temperature in the absence of light in a dry place.

The product thus obtained may be used as breadcrumbs and may be regenerated in a conventional oven, being characterized by an appearance and taste similar to those obtained by regeneration by frying in hot oil and by a crispy texture. Food products which may be coated with the breadcrumbs include, for example, a filled pancake, a piece of meat or a piece of fish.

EXAMPLES

The invention is illustrated by the following Examples.

Example 1

A mixture containing 33 kg of wheat flour, 2 kg of a mixture of lactose and dextrose, 1 kg of sodium chloride and 0.6 kg of skimmed milk powder is prepared. 9 kg of this mixture, 1 kg of hydrogenated palm oil and 0.9 litre of water are introduced through the feed hopper of a twin-screw extruder. The mixture thus prepared is extruded for about 40 to 50 seconds at a temperature of approximately 170° C. and under a pressure of 90 bar (rotational speed of the screws approximately 220 r.p.m.). The product issuing from the extrusion nozzle has a dry matter content of approximately 88 to 89%. It is then ground in a grinder and dried for 6 to 7 minutes in a fluidized-bed dryer (air entry temperature 105° C.).

Breadcrumbs are thus obtained in the form of a powder with a particle size of 0.5 to 2.0 mm, a dry matter content of 92 to 93% and a fat content of approximately 10%.

A filled pancake weighing 45 g is coated with 8 g of the breadcrumbs thus prepared and the breadcrumb-coated product thus obtained is then passed for 17 minutes through a conventional oven heated beforehand to 180° C.

The breadcrumb-coated product thus obtained is ready to eat and is similar in its external appearance, taste and texture to a known product regenerated by frying in hot oil, i.e. has a traditional taste, a crispy texture and, externally, the golden and uniform colour of a cooked product (with no "uncooked" parts).

Example 2

A mixture similar to Example 1 is prepared. 9 kg of this mixture, hydrogenated palm oil in the quantity shown in the following Table and 0.9 litre of water are introduced through the feed hopper of a twin-screw extruder. The mixture thus prepared is extruded, ground and dried under the same conditions as in Example 1.

Various breadcrumbs having a dry matter content of 92 to 93% are thus obtained.

Filled pancakes are coated with the various breadcrumbs thus prepared and the various breadcrumb-coated products thus obtained are passed through a conventional oven heated beforehand to 180° C. for 17 minutes.

The various breadcrumb-coated products are tasted by a group of 6 experienced tasters with the following results:

| Quantity of oil (kg) | % Oil | Product obtained |
| --- | --- | --- |
| 0.5 | 5 | No crispiness, uncooked appearance |
| 0.8 | 8 | Crispy texture |
| 1.0 | 10 | Cooked appearance, golden colour |
| 1.2 | 12 | Traditional taste |
| 1.6 | 15 | Greasy texture, cooked appearance |

It can be seen that an oil content of 8 to 12% enables breadcrumbs having the required characteristics to be obtained. After cooking in an oven, the breadcrumbs obtained are comparable in appearance, taste and texture with a product regenerated by cooking in oil. However, the product according to the invention is much lower in fats. Beyond 15%, the end product, although correct, is too greasy. On the other hand, it is possible that part of the fat no longer mixes uniformly with the other ingredients in the extruder.

Example 3

A mixture similar to that of Example 1 is prepared. 9 kg of this mixture, 1 kg of hydrogenated palm oil and 0.9 litre of water are introduced through the feed hopper of a twin-screw extruder. The mixture thus prepared is extruded at the temperatures and pressures indicated in the following Table. The product issuing from the extrusion nozzle has a dry matter content of the order of 89%. It is then ground and dried similarly to Example 1. Various breadcrumbs having a dry matter content of the order of 93% and a fat content of approximately 9.5% are thus obtained.

Pieces of fish are coated with the various breadcrumbs thus prepared and the various coated products thus obtained are passed through a conventional oven preheated to 180° C. for 17 minutes.

The various breadcrumb-coated products are tasted by a group of 6 experienced tasters with the following results:

| Temperature (° C.) | Pressure (bar) | Product obtained |
| --- | --- | --- |
| 100 | 90 | Hard product |
| 140 | 90 | No crispiness |
| 175 | 90 | Crispy texture |
| 215 | 90 | Cooked, golden and homogeneous appearance |
| 250 | 90 | No crispiness, heterogeneous surface appearance |

-continued

| Temperature (° C.) | Pressure (bar) | Product obtained |
|---|---|---|
| 190 | 40 | Hard product |
| 190 | 70 | Crispy texture |
| 190 | 110 | Correct product |
| 190 | 150 | No crispiness |

It can be seen that, for a pressure of 90 bar, the extrusion temperature should neither be too low nor too high if a crispy product of correct appearance similar to the prior art is to be obtained. The same applies to the extrusion pressure which should not be too low if a crispy product is to be obtained.

Example 4

A mixture similar to that of Example 1 is prepared and then extruded under the same conditions. The product issuing from the extrusion nozzle has a dry matter content of 89%.

The product is then dried for about 6 to 7 minutes in a fluidized-bed dryer (air entry temperature 105° C.) to give a product which has a dry matter content of 92 to 93% which is then ground in a grinder to obtain breadcrumbs in powder form. The formation of a large quantity of fines, i.e. very small particles, in a quantity of approximately 10% is observed when the product is dry-ground. On the other hand, when the product is wet-ground before being dried, no fines are formed.

A filled pancake weighing 45 g is coated with 8 g of the breadcrumbs thus prepared and the breadcrumb-coated product thus obtained is passed through a conventional oven preheated to 180° C. for 16 to 17 minutes. The ready-to-eat breadcrumb-coated product thus obtained lacks crispiness and has a pale uncooked external appearance and a correct taste.

Accordingly, it is preferable to grind the extruded product before it is dried when it still has a certain moisture content which, on the one hand, enables correct breadcrumbs to be obtained after oven regeneration and, on the other hand, ensures a smaller loss of product through less fines.

What is claimed is:

1. A process for preparing breadcrumbs comprising:
    introducing ingredients comprising a ground cereal, a reducing sugar, a fat and water into an extruder so that the ingredients have a dry matter content of at least 75% by weight and extrusion-cooking the ingredients at a temperature of at least 150° C. and under a pressure of at least 45 bar to obtain an extruded, cooked products;
    grinding the extruded, cooked product to obtain a ground particulate product;
    drying the ground particulate product to obtain a dried product; and
    wherein the fat is introduced in an amount and the ingredients are extrusion-cooked, the extruded, cooked product is ground and the particulate product is dried so that the dried product obtained has a fat content of from 7% to 12% by weight.

2. A process according to claim 1 wherein the fat is hydrogenated palm oil.

3. A process according to claim 1 wherein the ingredients are extrusion-cooked for at least 30 seconds.

4. A process according to claim 1 wherein the ingredients are extrusion-cooked for from 30 seconds to 80 seconds.

5. A process according to claim 1 or 3 wherein the ingredients are extrusion-cooked at a temperature of from 150° C. to 230° C.

6. A process according to claim 1 wherein the ingredients are extrusion-cooked and extruded so that the extruded, cooked product obtained from the extruder has a dry matter content of from 85% to 92%.

7. A process according to claim 1 wherein the ingredients are extrusion-cooked in a twin screw extruder having screws rotating at from about 200 RPM to 250 RPM.

8. A process according to claim 1 wherein the fat is introduced in an amount so that the dried product has a fat content of from 8% to 12% by weight.

9. A process for preparing a breadcrumb-coated food product comprising:
    introducing ingredients comprising a ground cereal, a reducing sugar, a fat and water into an extruder so that the ingredients have a dry matter content of at least 75% by weight and extrusion-cooking the ingredients at a temperature of at least 150° C. and under a pressure of at least 45 bar to obtain an extruded, cooked products;
    grinding the extruded, cooked product to obtain a ground particulate product;
    drying the ground particulate product to obtain a dried product; and
    wherein the fat is introduced in an amount and the ingredients are extrusion-cooked, the extruded, cooked product is ground and the particulate product is dried so that the dried product has a fat content of from 7% to 12% by weight; and
    coating the dried product on a food to obtain a coated food product.

10. A process according to claim 9 wherein the fat is hydrogenated palm oil.

11. A process according to claim 9 or 10 further comprising oven-cooking the coated product.

12. A process according to claim 11 wherein no additional fat is added to the dried product and wherein during coating and cooking, no additional fat is added to the dried product, the food product, or the coated product.

13. A process according to claim 9 wherein the ingredients are extrusion-cooked for from 30 seconds to 80 seconds at a temperature of from 150° C. to 230° C.

14. A process according to claim 9 wherein the fat is introduced in an amount so that the dried product has a fat content of from 8% to 12% by weight.

* * * * *

UNITED STATES PATENT AND TRADEMARK OFFICE
CERTIFICATE OF CORRECTION

PATENT NO. : 6,214,403 B1
DATED : April 10, 2001
INVENTOR(S) : Lars Broberg et al.

It is certified that error appears in the above-identified patent and that said Letters Patent is hereby corrected as shown below:

Column 2,
Line 4, after "and", insert -- a --.
Line 7, change "lesat" to -- least --.
Line 38, after "or", insert -- sugars --.
Line 40, delete "contains" and delete "which".

Column 5,
Lines 52-53, change "products" to -- product --.

Column 6,
Lines 31-32, change "products" to -- product --.

Signed and Sealed this

Twentieth Day of November, 2001

Attest:

NICHOLAS P. GODICI
Attesting Officer
Acting Director of the United States Patent and Trademark Office